United States Patent Office

3,471,431
Patented Oct. 7, 1969

3,471,431
TERMINAL SULFONATE POLYMERS, LATICES THEREOF, AND METHOD OF PREPARATION
Roger H. Mann, Corona Del Mar, and Joseph T. Bailey, Redondo Beach, Calif., assignors to Shell Oil Company, New York, N.Y., a corporation of Delaware
No Drawing. Filed Mar. 4, 1966, Ser. No. 533,805
Int. Cl. C08d 5/00
U.S. Cl. 260—29.7         10 Claims

ABSTRACT OF THE DISCLOSURE

A process for preparing a monosulfonated polymer by dissolving a polymer having a single terminal alkali metal radical and reacting therewith a sultone. The disclosure also covers the monosulfonated polymer as well as latices made from mixtures of monosulfonated and unsulfonated polymers.

---

This invention relates to novel terminally sulfonated polymers, their preparation and latices made therefrom.

The preparation of polar substituted derivatives of polymeric materials has been studied in many aspects; however, the production of polymers having a polar group placed in a specifically designated position is rare. In one of the few types of polymerization in which specific position designation of polar substitution can be made, the polar radicals are placed on both ends of a polymer chain. In many cases this results in gelation of the polymer, either due to its association characteristics or due to cross-linking which can readily occur.

Recently developed polymers which are of special interest are block copolymers of monovinyl arenes with conjugated diolefins made in such a way as to produce "self-curing" block copolymers of the general configuration.

A—B—A wherein each A is a polymer block of a monovinyl arene and B is a polymer block of a conjugated diene, as well as hydrogenated products thereof. These materials have been found to be extremely useful because they do not require vulcanization especially when the desired relationship of molecular weight between the several blocks is present. However, they possess one disadvantageous property which it would be highly desirable to correct or overcome, namely, that they produce relatively unstable latices. The reason for this is obscure, but microscopic examination of some latices shows a number of irregularly shaped particles present in the form of disc or saucer shapes, contrasted to the desirable spherical shape which is characteristic of stable latices.

Other problems which have not been solved satisfactorily comprise the production of latices of what may be termed high impact polystyrene wherein the styrene latex is modified by the presence of an elastomeric component, since in many instances the addition of one or the other of these components results in an unstable latex which readily coagulates. Furthermore, it is often desirable to improve the processability or green strength properties of certain rubbers contained in latex form but the addition of a block copolymer in the form of a latex often destabilizes the latex and results in massive coagulation.

It is an object of the present invention to provide an improved process for the production of sulfonated polymers. It is another object of the invention to provide improved monosulfonated terminally substituted polymers. It is a special object of the invention to provide improved polymeric latices. Other objects will become apparent during the following detailed description of the invention.

Now, in accordance with the present invention, novel sulfonated polymers are provided wherein only one terminal of each polymer chain bears a sulfonate radical. More particularly, the sulfonate radical has the general configuration $$(CH_2)_{3-12}SO_3X$$

wherein X is a radical of the group consisting of hydrogen, alkali metal or ammonium ions. The polymers of which each linear chain is terminated on one end only with the subject sulfonate radicals comprise homopolymers of conjugated dienes, homopolymers of monovinyl arenes, random copolymers of monovinyl arenes with conjugated dienes and block copolymers of monovinyl arenes with conjugated dienes.

Still in accordance with the present invention, novel latices having excellent mechanical stability comprise a continuous aqueous phase and as a discontinuous phase at least one of the monosulfonated polymers. In further accordance with the invention, modified latices comprise those just described containing in addition a non-sulfonated polymer of the group consisting of elastomeric conjugated diene homopolymers, monovinyl arene homopolymers, random copolymers of monovinyl arenes with conjugated dienes and block copolymers of monovinyl arenes with conjugated dienes, the weight ratio of sulfonated polymer to unsulfonated polymer being between 1:1 and 10:1.

Another aspect of the present invention comprises the process for the formation of the subject sulfonated polymers which comprises forming a solution of a "living" polymer wherein each chain is terminated on one end only with an alkali metal radical and reacting therewith an aliphatic sultone, said sultone, having from 3 to 12 carbon atoms per molecule.

The novel products of the invention broadly comprise the subject class of polymers and copolymers which are essentially linear polymeric molecules, one terminal of each polymer chain bearing a sulfonate radical. These are to be distinguished from polymers in which both terminals of the polymer chains are sulfonated since it has been found that the latter type of products leads rapidly to gelation and cross linking which reduce their utility and ease of processing. Moreover, the type of polymers in which both terminals are sulfonated do not form satisfactory latices due to the high polarity of the molecules and consequent tendency thereof to create stable foams rather than true latices.

The polymers which may be monosulfonated according to the present invention include homopolymers of conjugated dienes such as polystyrene or polybutadiene; homopolymers of monovinyl arenes such as polystyrene or polyalpha-methyl styrene; random copolymers of monovinyl arenes with conjugated dienes such as styrene-butadiene copolymers having either elastomeric or thermoplastic properties dependent upon the ratio of the two monomers; and especially block copolymers of monovinyl arenes with conjugated dienes. In the latter class, block copolymers are especially contemplated having either two or three block components. Typical of these are the two-block copolymers having the typical structure polystyrene-polybutadiene and three-block copolymers such as those having the structure polystyrene-polybutadiene-polystyrene or polystyrene-polyisoprene-polystyrene. These polymers may be subjected to hydrogenation, if desired, to reduce the original unsaturation. While double bonds in either or both the vinyl arene or conjugated diene portions of the polymer may be reduced, it is preferred to reduce the unsaturation of at least the diene portion by at least about 50%.

It is especially contemplated that these block copolymers be elastomeric but if the monovinyl arene content is sufficiently high then they may be thermoplastic polymers. Preferably the block copolymers are such that they have polyvinyl arene blocks having an average molecular weight between about 8,000 and 45,000 while the conjugated diene polymer block preferably has a number average molecular weight between about 35,000 and 150,000. Within these molecular weight ranges, the ABA type of block copolymers have the unique feature of exhibiting the stress-strain properties of an elastomer without the requirement that it be subjected to curing or vulcanization. These are sharply differentiated from other rubbers which require vulcanization in order to obtain satisfactory stress-strain properties.

All of the above polymers may be utilized without further alteration in conjunction with sulfonated derivatives thereof or, on the other hand, they may be converted to the sulfonated derivative and then utilized without further modification. The broad aspect of the present invention contemplates the mono-terminal sulfonation of the above classes of polymers. Hydrogenation, if desired, may be effected after sulfonation.

The preferred form of sulfonation is by means of reaction of alkali metal terminated polymers with an aliphatic sultone. By this means sulfonation is effected under closely controlled conditions such that the sulfonate group is definitely positioned at only one end of the polymer chain since the sultone reacts with an alkali metal ion and not with the chain directly. Hence it is desirable to utilize living polymer chains in which only one end of the chain terminates in an alkali metal radical. The proportion of sultone utilized for this purpose may be varied depending on the product desired. All of the alkali metal terminals may be converted to sulfonate derivatives if desired. On the other hand, it may be desirable to convert only a certain fraction thereof. For example, from 10 to 100% of the alkali metal terminal ions may be reacted with an aliphatic sultone to form what is in effect a mixture of polymers, the mixture comprising monosulfonated polymer together with unaltered polymer.

If all of the terminal alkali metal ions are converted to sulfonate derivatives by reaction with the aliphatic sultone, then the entire product comprises a mono-terminally sulfonated polymer derivative which may be utilized as such or mixed with any other desired polymer, either in solid form, as a cement or as a latex. Since these sulfonated polymers are more polar than the original polymers they are susceptible to many utilities which the original polymers would not satisfy such as the formation of wrappers and the like on which printing is then readily possible. A further feature comprises the admixture of the sulfonated block copolymers with polyolefins since these have been found to be compatible, the improved aspect being that the polar monosulfonated block copolymer substantially improves the printability of the resulting polyolefin-block copolymer composition.

One of the striking aspects of the present invention comprises the superior properties of the latices made from the mono-terminally sulfonated polymers, which resist to a high degree the tendency toward coagulation exhibited by many of the polymers prior to sulfonation. Consequently, means presented for not only preparing latices of high mechanical stability from the monosulfonated derivatives described here but also of modifying other latices with the sulfonated polymers without deterioration of the stability properties of the original latices. For example, the modification of polyisoprene latex with a block copolymer would be desirable, particularly, for improving the physical properties of the polyisoprene, but in the past it has been noted that the addition of a block copolymer latex to polyisoprene latex resulted in a lower stability of the latter latex. However, with the addition of 10–50% by weight of the block copolymer in the form of a latex to a polyisoprene latex containing 100 parts by weight of polyisoprene the physical properties and particularly the green strength of the isoprene is substantially improved without deterioration of the latex stability. Furthermore, the modification of a latex such as a polystyrene latex with the sulfonated block copolymer materially improves the impact strength of the polystyrene while at the same time a combined latex of high mechanical stability is achieved.

Suitable aliphatic sultones include propane sultone, butane sultone, pentane sultone, hexane sultone and octane sultone. These sultones may contain hydrocarbon substituents from any of the carbon atoms forming a part of the sultone ring or, more preferably, all of the carbon atoms form a part of the sultone bridge. Gamma propane sultone is preferred. An amount of sultone between about 0.1 and 10 mols of sultone per mol of alkali metal terminal ion on each polymer chain may be utilized. It will be obvious that when less than equal molar amount of sultone is employed only a corresponding amount of the alkali metal will be replaced by the sulfonate radical. Consequently, by using less than equal molar amount the resulting product comprises a mixture of the sulfonated polymer and the original polymers.

The reaction of an aliphatic sultone with the alkali metal monoterminated polymers is readily performed by a reaction temperature between about −25 and 100° C. for 20 to 40 minutes preferably in a solution of the polymer, the solvent being a relatively inert hydrocarbon. The resulting product is normally a sulfonate in which the metallic neutralizing ion is that originally present as the alkali metal ion of the original block copolymer. This may be replaced by the addition of a suitable hydroxide such as potassium hydroxide in a sufficient amount to cause such replacement.

A number of methods are available for the preparation of suitable latices but one of the preferred processes may be referred to as a "foamover" process. The following details are descriptive of this type of process: A solution of the sulfonated polymer in a suitable water immiscible solvent such as a lower alkane, cycloalkane or aromatic hydrocarbon is emulsified with water by the aid of a rosin soap or higher fatty acid soap. Potassium oleate is suitable for this purpose. The sulfonated polymer is preferably in the form of a alkali metal or ammonium salt of the sulfonic acid terminal radical. The entire mixture is then heated to an extent sufficient to volatilize a sufficient amount of the solvent to cause the entire composition to form a foam of shaving cream consistency. This foam is then allowed to cool to an extent sufficient to liquify the solvent. The step of foaming will be found to have cause transfer of the sulfonated polymer from the hydrocarbon solution into the aqueous phase as a latex, the hydrocarbon which has been liquified forming a separate phase which can then be separated by decantation or the like. The resultant dilute latex may then be concentrated by heating to a temperature sufficient to cause volatilization of a substantial amount of the water. Latices having from 40 to 60% solids may be formed by this manner of operation. The sulfonation of the polymer overcomes one of the great disadvantages encountered in the preparation of ordinary latices by this process in that massive coagulation is thereby avoided.

The following example illustrates the process of the present invention and products obtained thereby:

Example I

A block copolymer having the structure polystyrene-polyisoprene-polystyrene with block molecular weights of 20,000–105,000–20,000 was prepared by polymerization utilizing lithium butyl catalyst in cyclohexane solution. The block polymer was prepared by initial polymerization of styrene followed by injection of isoprene and lastly of a further portion of styrene. The individual block polymer chains under these conditions are terminated on one end by a lithium ion. It was found that when the lithium ion was eliminated by reaction with isopropanol to result in a metal-free polymer that this polymer was not capable of forming stable latices but that these coagulated during stripping and concentrating process steps involved in the latex manufacture. However, when the lithium terminated polymers were treated with 1.5 mols of propane sultone per mol of lithium at 50° C. and thereafter converted to the potassium sulfonate salt of the resulting sulfonate by addition of potassium hydroxide to the cement, the resulting polymer could be formed into a stable latex which did not coagulate under the same latex forming conditions.

We claim as our invention:

1. A latex comprising a continuous aqueous phase containing an alkali metal monocarboxylic acid soap and, as a discontinuous phase, 40–60% by weight of a polymer of the group consisting of elastomeric conjugated diene homopolymers, monovinyl arene homopolymers, elastomeric random copolymers of monovinyl arene with conjugated dienes, and block copolymers of monovinyl arenes with conjugated dienes wherein only one terminal of each polymer chain bears a sulfonic acid radical, said radical having the general formula $(CH_2)_{3-12}$—$SO_3X$ wherein X is selected from the group consisting of hydrogen, alkali metal and ammonium.

2. A latex according to claim 1 containing in addition a polymer free of sulfonic acid radicals of the group consisting of elastomeric conjugated diene homopolymers, monovinyl arene homopolymers, random copolymers of monovinyl arenes with conjugated dienes, and block copolymers of monovinyl arenes with conjugated dienes, the weight ratio of sulfonated polymer to unsulfonated polymers being between about 1:10 and 10:1.

3. A process for the preparation of a mono-sulfonated polymer which comprises:
(a) forming a solution of a polymer of the group consisting of elastomeric homopolymers of conjugated dienes, monovinyl arene homopolymers, random copolymers of monovinyl arenes with conjugated dienes, and block copolymers of monovinyl arenes with conjugated diene; one terminal of each polymer chain bearing an alkali metal radical;
(b) and reacting therewith 0.1–10 mols of a sultone per mol of alkali metal radical.

4. A mono-sulfonated polymer having the general configuration:

$$P[CH_2)_{3-12}\text{—}SO_3X]$$

wherein P is a linear polymer of the group consisting of elastomeric homopolymers of conjugated dienes, monovinyl arene homopolymers, random copolymers of monovinyl arenes with conjugated dienes, and block copolymers of monovinyl arenes with conjugated dienes; and hydrogenated derivatives thereof, one terminal of each polymer chain bearing the radical $$[(CH_2)_{3-12}\text{—}SO_3X]$$

wherein X is a radical of the group consisting of hydrogen, alkali metal and ammonium.

5. A monosulfonated polymer according to claim 4 having the general configuration $$A\text{—}B\text{—}A[C_3H_6\text{—}SO_3X]$$

wherein each A is a monovinyl arene polymer block and B is a conjugated diene polymer block.

6. A monosulfonated polymer according to claim 5 having the general configuration polystyrene-polybutadiene-polystyrene-$C_3H_6$—$SO_3K$.

7. A latex according to claim 1 wherein the monosulfonated polymer is the polymer according to claim 6.

8. A latex according to claim 2 wherein the monosulfonated polymer is one according to claim 6, the unsulfonated elastomer being a block copolymer having the general configuration polystyrene-polybutadiene-polystyrene.

9. A process according to claim 3 wherein the polymer is a block copolymer having the general structure polystyrene-polyisoprene-polystyrene, one terminal of only one of the polystyrene blocks bearing a lithium radical.

10. A process according to claim 3 wherein the sultone is propane sultone.

References Cited

UNITED STATES PATENTS 3,354,116  11/1967  Gruver et al. _____ 260—94.7
3,108,994  10/1963  Zelinski et al. _____ 260—79.3

MURRAY TILLMAN, Primary Examiner

W. J. BRIGGS, Assistant Examiner

U.S. Cl. X.R.

260—29.6, 79.3, 79.5, 85.1, 93.5, 94.7, 879, 880, 886